Feb. 19, 1935. A. F. WINTERCORN 1,991,643
COMBINED BUMPER AND WEATHER SEAL MEANS FOR AUTOMOBILE DOORS
Filed April 26, 1934
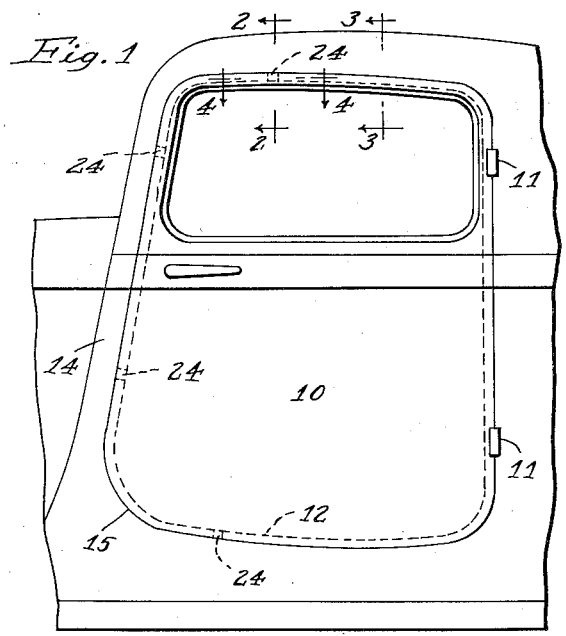
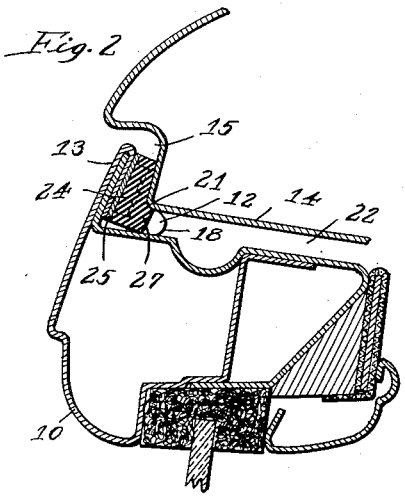
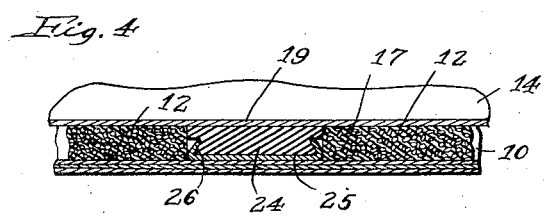
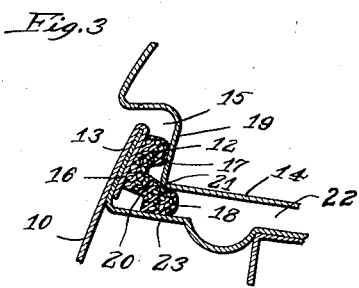
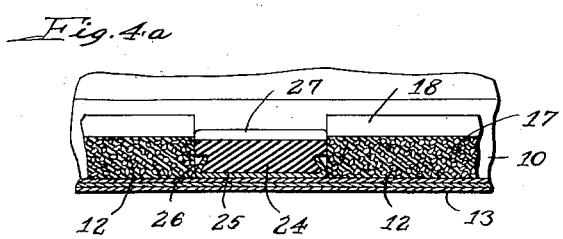
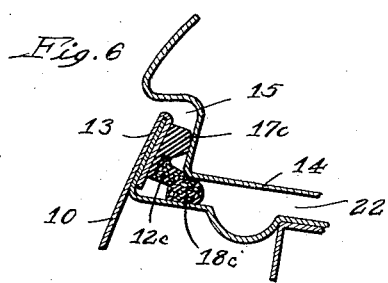
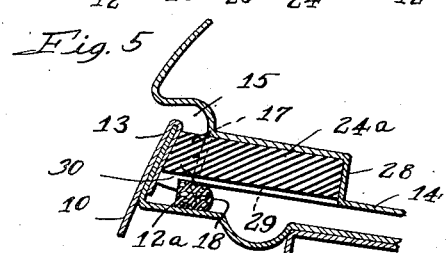
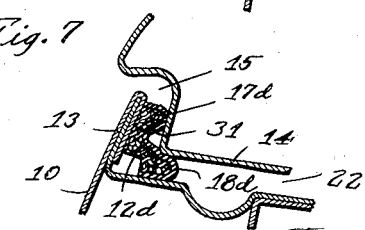
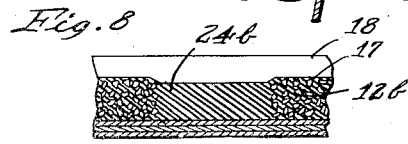

Patented Feb. 19, 1935

1,991,643

UNITED STATES PATENT OFFICE 1,991,643

COMBINED BUMPER AND WEATHER SEAL MEANS FOR AUTOMOBILE DOORS

Andrew F. Wintercorn, Rockford, Ill., assignor to The Atwood Vacuum Machine Company, Rockford, Ill., a copartnership composed of Seth B. Atwood and James T. Atwood Application April 26, 1934, Serial No. 722,494

14 Claims. (Cl. 296—44)

This invention relates to motor vehicle constructions and has particular reference to means for cushioning the closing of the doors and sealing the same against the weather.

Automobile doors have, in the past, relied upon rubber bumper blocks to absorb the shock and jar of closing, but little or no attention was given the matter of weather sealing. At best, some projecting portions of the interior upholstering were relied upon to give some protection from the weather at the joints between the door and the pillars and other parts of the door frame. Obviously, such interior seals aside from giving doubtful benefit for weather protection, afforded no protection whatever against the infiltration of rain or snow into the spaces between the door and frame with the result that the door was apt to freeze in place and make opening difficult, if not impossible. Hence, there is no question as to the advantage of sealing from without rather than from within. In the copending application of James R. Hughes, Serial No. 720,783, filed April 16, 1934, there is disclosed a sponge rubber strip interposed directly between the outer projecting flange of the door and the outer marginal recess in the frame into which the flange projects. This strip is subjected to flexing and compression in the closing of the door for cushioning action as well as weather sealing. It is the principal object of my invention to provide a generally similar type of strip, correspondingly located, and to provide in connection therewith solid rubber means, either interposed between sections of the sponge rubber strip or molded integral therewith to prevent destructive compression of the sponge rubber by assuming enough of the cushioning action, without interfering in any way with the combined cushioning and weather sealing action of the strip.

The invention is illustrated in the accompanying drawing, in which—

Figure 1 is a side view of a portion of an automobile body shown a door equipped with the combined bumper and weather seal means of my invention;

Figs. 2 and 3 are vertical sections, and Fig. 4 is a horizontal section on the correspondingly numbered lines of Figure 1;

Fig. 4a is a view similar to Fig. 4 showing the sponge rubber and solid rubber in uncompressed condition, as distinguished from the compressed condition of Fig. 4;

Fig. 5 is a section similar to Fig. 2 or Fig. 3 showing a modified or alternative construction, the same being true of Figs. 6 and 7, which are further modified or alternative constructions, and Fig. 8 is a section similar to Fig. 4a showing still another modified or alternative construction.

Similar reference numerals are applied to corresponding parts throughout the views.

The door 10, mounted on the usual hinges 11, is in accordance with the Hughes application provided with a cushioning and sealing strip 12 on the inside of its outwardly projecting marginal flange 13. The flange 13 is on the exterior of the door, and the door frame 14 has a continuous marginal recess 15 to receive this flange so that the outside of the door comes substantially flush with the outside of the body when closed. The strip 12 will ordinarily be provided all the way around the door but may be provided only in sections and still afford some of the benefits of my invention. The strip 12 is preferably of molded sponge rubber, because that material has the desired softness and resilience to compress readily for sealing purposes and have the requisite "spring back" for cushioning purposes. The strip 12 is cemented, or otherwise suitably secured, at the back thereof to the inside 16 of the flange 13, and is preferably generally V-shaped in cross-section so as to provide two longitudinal beads 17 and 18 for contact with the door frame along two substantially parallel lines. In that way, a double seal is secured, which is more effective from the standpoint of weather protection. As clearly appears in Fig. 3, the bead 17, which is outermost, makes substantially right angle contact with the flat bottom 19 of the recess 15 for the principal cushioning action and incidentally sealing. The other bead 18 has an inclined side face 20 which, in the closing of the door, makes wiping contact with the edge 21 of the door frame adjacent the bottom 19 of the recess, principally for sealing and incidentally for some cushioning action. The inclination of the side of the bead 18 also insures a continuous seal all around the door because even though the joint 22 between the door and frame may not be uniform all around the door, the strip will be placed far enough toward the outer edge of the flange 13 to insure some portion of the inclined face 20 of the bead 18 contacting the edge 21 for sealing purposes. The bead 18 will flex laterally toward the peripheral wall 23 of the door and come into abutment therewith, and in that way not only insure a better seal at 21 but also absorb some of the shock and jar in the closing of the door. The bead 18 must, of course, be sufficiently longer than the bead 17 to

2  1,991,643 reach into the joint 22 between the door and frame.

Out of regard for the softness of the sponge rubber strip 12 and the fact that it might break down if subjected to heavy pressure repeatedly, as well as its tendency to break loose from the flange 13 to which it is usually cemented, as at 16, it is the object of my invention to provide less easily compressible solid rubber bumper means in combination with the sponge rubber strip. In Figure 1, these solid rubber bumpers are numbered 24. Four are indicated but, of course, any number might be used. They are shown at the top, front and lower edges of the door but could be provided on all four edges in uniformly spaced relation. In the main, however, it is contemplated that these solid rubber bumper blocks will be used in about the same locations with respect to the door and door frame as the practice has dictated advisable in the case of the ordinary rubber bumpers used in the past, which, however, were mounted on the body usually instead of on the door, as herein disclosed. The bumper blocks 24 may be mounted in any suitable or preferred manner; I have disclosed a sheet metal retainer 25 for each block welded, or otherwise suitably secured, to the inside of the flange 13 and having bent-in lugs 26 projecting from opposite ends into recesses provided therefor in the ends of the block, see Fig. 4. Each block 24 may be provided with a projecting rib 27 to enter the joint 22, whereby to provide the weather seal in the gaps between the strips 12. In other words, the projections 27 will assume the duty of the beads 18 so far as the blocks 24 are concerned.

In operation, it will be seen from a comparison of Figs. 4 and 4a that when the door is closed, the sponge rubber strips 12 are subjected only to a fraction of the compression that would otherwise result, owing to the fact that the solid rubber blocks 24 are not capable of compressing as readily. In that way, the strips 12 are protected against destructive compression, enough of the cushioning action being assumed by the solid rubber blocks without interfering with the combined cushioning and weather sealing action of the strips. There is consequently less wear and tear on the sponge rubber strips and less danger of their coming loose. In uncompressed condition the strips project slightly beyond the blocks 24, as shown at Fig. 4a, so that they will have to be compressed first to a slight extent before the blocks are subjected to compression. As soon as the blocks 24 come into engagement with the bottom 19 of the recess 15, it is obvious that there is very little further compression of the strips and blocks; consequently, the sponge rubber parts are never squashed and the life thereof is considerably prolonged. It is, of course, clear that the strips 12 and blocks 24 together serve to completely seal the joints 22 between the door and frame against the weather. The seal is not only more effective than that secured with the old practice of having projecting portions of the upholstering for an inside seal, but also closes the joints to keep out rain and snow, so that there is never any likelihood of the door freezing in place.

A further advantage of this invention to which attention was not called before is the fact that the compression of the strip between the door and frame, especially at the hinge side of the door, results in making the door tighter than it was ever possible heretofore; that is, the door is not free to rattle, even though the hinges might have sufficient play therein to allow rattling otherwise. The compression of the strip, in other words, takes up any play in the hinges as well as at the lock or latch, and there is accordingly no opportunity for rattling. With door bumpers as heretofore provided, the door would rattle unless some provision were made to place the hinges under constraint, and many accessories for that purpose have appeared on the market.

Still another advantage of the invention to which reference has not been made heretofore, is the fact that the strip, working in a combination with the bumper blocks, not only cushions the closing of the door but deadens the sound of a door closing so that instead of a "tin pan" effect, there is the sound and sense of a heavy composite door closing, even though the door be of light sheet metal construction.

Referring to Fig. 5, I have shown a modified or alternative construction in which the bumper blocks are mounted on the door frame instead of on the door, the block 24a being "buttoned" into a retainer 28 formed as a cut and bent-in portion of the frame 14, the bumper having projecting end portions 29 engaging inside the frame 14 to retain the block in place, as in Perry Patent 1,884,997. The block 24a engages the inside of the flange 13 of the door, the strip 12a being cut away, as at 30, to receive the end of the bumper. Since only the upper bead 17 need be cut away, the lower bead 18 will still serve its purpose so far as weather sealing is concerned. This construction will, of course, operate in about the same manner as the one previously described, that is, the bead 17 of the strips 12a will be subjected to slight compression before the bumper blocks 24a come into abutment with the door to assume their share of the shock and jar in cushioning the door closing.

Fig. 8 shows a construction closely related to that of Figures 1-4 in which the sponge rubber strip 12b has solid rubber sections 24b molded integral therewith at the points where the solid rubber bumper blocks would otherwise be placed. If desired, these segments could be of much shorter length than is indicated in Fig. 8 and provided at regularly spaced intervals the full length of the strip, in order to give the sponge rubber protection against squashing at all points on the door. As indicated, the solid rubber sections 24b are properly made of smaller cross-section than the sponge rubber portions so that the sponge rubber will be subjected to slight compression before the solid rubber comes into play, as previously described.

In Fig. 6, I have shown a strip 12c, the bead 17c of which is of solid rubber its full length, whereas, the bead 18c is of sponge rubber its full length. With this construction, the door bumper action is assumed almost exclusively by the bead 17c and the weather seal action is assumed by the bead 18c. Manifestly, the less readily compressible bead 17c will prevent the sponge rubber bead from being squashed and such a composite strip would, therefore, be extremely durable. Very likely, this strip could be used along the top, front, and lower edges to good advantage, in connection with an ordinary sponge rubber strip along the rear edge, next to the hinges, where greater compressibility is required.

The strip 12d shown in Fig. 7 has the body thereof of sponge rubber with a facing or skin covering 31 of solid rubber. This sort of construction, it is believed, would be more durable than a strip entirely of sponge rubber, because the solid rubber offers better wearing properties and would also reduce the likelihood of extreme compression of the strip and in that way add to its life.

It is believed the foregoing description conveys a good understanding of the objects and advantages of my invention. The appended claims have been drawn with a view to covering all legitimate modifications and adaptations.

I claim:

1. In an automobile having a hinged door, a bumper strip of easily compressible sponge rubber arranged to be compressed in the closing of the door, and less easily compressible solid rubber bumper means arranged to be also compressed in the closing of the door, the latter being disposed for compression after an initial amount of compression of the strip, whereby to add protective resistance against extreme compression of the strip, said solid rubber being in lengths interposed at certain points between lengths of the soft rubber.

2. In an automobile having a body and a door hinged thereon, the combination of resilient bumpers at spaced points in the joint between the door and body to cushion the closing of the door, and a compressible weather strip extending lengthwise of the joint from bumper to bumper, and serving, with the bumpers, to completely close and seal the joint.

3. A structure as set forth in claim 1 wherein the solid rubber means is molded integral with the sponge rubber strip.

4. A combined bumper and weather strip for doors comprising a rubber strip partly of soft rubber and partly of hard rubber, the hard rubber being in lengths interposed at certain points between lengths of the soft rubber.

5. A combined bumper and weather strip for doors comprising a rubber strip having two parallel projecting beads, one of hard rubber for bumper purposes, and the other of soft rubber for weather seal purposes, the second bead being arranged to be compressed in and close the joint between a door and door frame.

6. In an automobile having a door mounted on hinges on the body thereof, the combination of compressible bumper and weather strips on one of the door and body portions extending lengthwise of the joint to seal the joint except for one or more gaps between the ends of adjacent strips, and less easily compressible bumper blocks on one of the door and body portions filling said gaps and serving to cushion the closing of the door.

7. In an automobile having a body and a door hinged thereon, the combination with resilient bumpers at spaced points in the joint between the door and body to cushion the closing of the door, and a compressible weather strip extending lengthwise of the joint from bumper to bumper, said strip having a longitudinal projecting portion fitting in and sealing the joint, and said bumpers also having portions formed thereon to enter the joint for sealing purposes.

8. In a motor vehicle having a door hinged on the body thereof, soft rubber cushioning and sealing strip means compressed in the joint between the door and body in the closing of the door, and hard rubber bumpers at the points of principal percussion to absorb destructive compressive forces to protect said strip means, the strip means extending from bumper to bumper to form therewith a complete seal for said joint.

9. In an automobile having a hinged door, a compressible bumper arranged to be compressed in the closing of the door, said bumper being partly of relatively soft rubber adapted to be readily compressed, and partly of relatively hard rubber not so readily compressible, the latter having the soft rubber disposed for partial compression prior to compression of the hard rubber, whereby the latter is arranged to protect the soft rubber against extreme compression.

10. In an automobile having a body and a door hinged thereon, a combined bumper and weather strip arranged to be compressed in the closing of the door, said strip having two parallel projecting beads, one of hard rubber for bumper purposes and the other of soft rubber for weather seal purposes, the second bead fitting in and sealing the joint between the door and body.

11. In an automobile having a body and a door hinged thereon, a combined bumper and weather strip arranged to be compressed in the closing of the door, said strip having two parallel projecting beads, the strip having the body thereof formed of soft rubber and having a hard rubber covering, one of said beads being for bumper purposes and the other for weather seal purposes, the second bead fitting in and sealing the joint between the door and body.

12. A combined bumper and weather strip for doors comprising a rubber strip having a portion of soft rubber and another portion of hard rubber, the hard rubber portions being disposed for engagement with one surface in the closing of a door against a jamb, and the soft rubber portions being disposed for engagement with another surface, and so that the soft portion is initially slightly compressed before compression of the hard portion commences, whereby the hard portion serves to protect the soft portion against extreme compression.

13. In an automobile having a hinged door, a bumper strip of easily compressible sponge rubber arranged to be compressed in the closing of the door, and less easily compressible solid rubber bumper means arranged to be also compressed in the closing of the door, the latter being disposed behind the plane of the easily compressible sponge rubber for compression after an initial amount of compression of the strip, whereby to add protective resistance against extreme compression of the strip, the solid rubber means being molded integral with the sponge rubber strip.

14. A bumper for doors comprising a rubber body having a portion of soft rubber and another portion of hard rubber, the hard rubber portion being disposed for engagement with one part in the closing of a door against a jamb, and the soft rubber portion being disposed for engagement with another part, and so that the soft portion is initially slightly compressed before compression of the hard portion commences, whereby the hard portion serves to protect the soft portion against extreme compression.

ANDREW F. WINTERCORN.